(12) United States Patent
Venkata et al.

(10) Patent No.: US 11,838,838 B2
(45) Date of Patent: Dec. 5, 2023

(54) METHOD AND SYSTEM FOR APPLICATION SERVICE MANAGEMENT

(71) Applicant: Verizon Patent and Licensing Inc., Basking Ridge, NJ (US)

(72) Inventors: Sivanaga Ravi Kumar Chunduru Venkata, Irving, TX (US); Kirk Campbell, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/224,393

(22) Filed: Apr. 7, 2021

(65) Prior Publication Data

US 2022/0329995 A1    Oct. 13, 2022

(51) Int. Cl.
| | | |
|---|---|---|
| G06F 15/177 | (2006.01) | |
| H04W 4/50 | (2018.01) | |
| G06F 8/77 | (2018.01) | |
| H04L 41/0816 | (2022.01) | |

(52) U.S. Cl.
CPC ............... *H04W 4/50* (2018.02); *G06F 8/77* (2013.01); *H04L 41/0816* (2013.01)

(58) Field of Classification Search
None
See application file for complete search history.

(56) References Cited

U.S. PATENT DOCUMENTS

2020/0287927 A1* 9/2020 Zadeh ..................... H04L 43/08
2022/0417842 A1* 12/2022 Yang ...................... H04W 24/10

FOREIGN PATENT DOCUMENTS

WO    WO-2017100640 A1 *  6/2017

* cited by examiner

*Primary Examiner* — Atta Khan

(57) ABSTRACT

A method, a device, and a non-transitory storage medium are described in which an application layer network management service is provided. The service may allow third parties associated with an application layer network to develop and on-board application-aware logic that manages application services. The application-aware logic may include optimization of the application service and remedial procedures that address events associated with degradation and/or performance of the application service. The application-aware logic may be implemented in conjunction with other logic provisioned by a network provider.

20 Claims, 5 Drawing Sheets

METHOD AND SYSTEM FOR APPLICATION SERVICE MANAGEMENT

BACKGROUND

Development and design of networks present certain challenges from a network-side perspective and an end device perspective. To enhance performance, among other things, a multi-access edge computing (MEC) network (also known as a mobile edge computing (MEC) network) and other application layer network architectures are being explored for provisioning applications, services, and assets to end devices and users.

DETAILED DESCRIPTION

Figure 1:
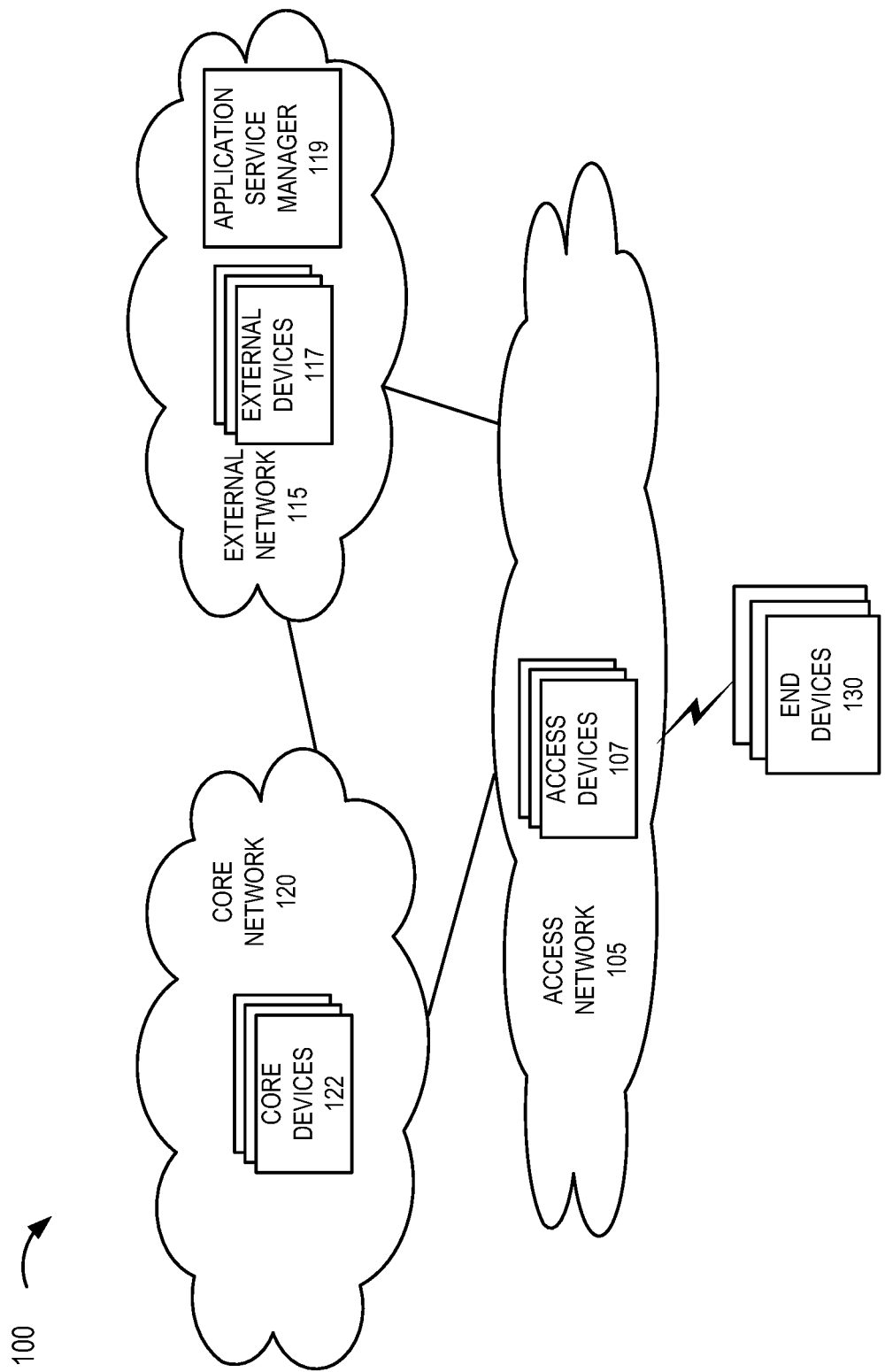
FIG. 1 is a diagram illustrating an exemplary environment in which an exemplary embodiment of an application layer network management service may be implemented.

The following detailed description refers to the accompanying drawings. The same reference numbers in different drawings may identify the same or similar elements. Also, the following detailed description does not limit the invention.

MEC networks or other types of end device application or service layer networks (referred to as an "application layer network") provide an application, a service, and/or an asset (referred to as an "application service") to end devices and/or users. The application service may include a monolithic application, a microservice, or another type of configurable architecture of the application service.

A device and/or a system that optimizes the deployment and management of an application service in an application layer network may include a policy device that influences or governs deployment and/or management decisions. For example, a policy engine may be used in a MEC platform to facilitate deployment and management of an application service which may include, for example, providing various optimizations pertaining to auto-scaling, terminating, migrating, backing-up, restoring, and/or another procedure associated with the application service. The configuration of the device and/or the system poses various challenges in managing the application layer network and modifying the device and/or system with new or different capabilities.

In a multi-tenant application layer network, an application layer network provider and/or another type of entity may manage, in whole or in part, application services associated with various application service providers. However, this framework may not be ideal because application service providers may be better able to manage their own application services based on the intimate knowledge of their respective application service, how it operates, expected performance metrics, optimizations for the application service, and measures to be taken when the application service is under-performing or other types of events may occur, for example.

According to exemplary embodiments, an application layer network management service is described. According to an exemplary embodiment, the application layer network management service may be implemented by a network device of an application layer network. The application layer network management service may enable the management of an application service. According to an exemplary embodiment, the application layer network management service may provide software development kits (SDKs) that enable a user (e.g., an application provider, an application developer, etc.) to configure and manage various facets of an application service, as described herein. The application layer network management service may also provide application programming interfaces (APIs) and other types of developmental tools and/or resources that may be used to support the management of the application service.

According to an exemplary embodiment, the application layer network management service may provide pre-configured functional blocks and/or workflows directed to a managerial facet of the application service that a user may use or modify (e.g., customize). Additionally, or alternatively, the application layer network management service may allow the user to develop his/her own management services and workflows from scratch, for example.

According to an exemplary embodiment, the application layer network management service may enable the user to provision a management service for an application service that may be pre-configured, customized, or proprietary (e.g., new, developed from scratch, etc.). According to an exemplary embodiment, the application layer network management service may include artificial intelligence (AI) logic (e.g., machine learning (ML), etc.) to facilitate the execution of a managerial function and/or workflow. According to an exemplary embodiment, the application layer network management service may enable the creation of customized or proprietary workflows or use a pre-configured workflow. The user may use any combination of pre-configured, customized, and/or proprietary managerial functions for application service management.

In view of the foregoing, application layer network management service may provide a more flexible and diversified arrangement to manage application services in a multi-tenant application layer network. The application layer network management service may enable users to onboard and manage application services including optimizations and event-drive decision-making in a variety of configurations. Applicant service providers may implement application service management in a manner better suited to their needs than other parties, such as an application layer network provider.

FIG. 1 is a diagram illustrating an exemplary environment 100 in which an exemplary embodiment of application layer network management service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117) and an application service manager 119. Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a fifth generation (5G) access network (5G AN) or a 5G RAN, a future generation RAN (e.g., a sixth generation (6G) RAN, a seventh generation (7G) RAN, or a subsequent generation RAN). Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including an EPC network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) new radio (NR), stand-alone (SA) NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved LTE (eLTE) evolved Node B (eNB), an eNB, a radio network controller (RNC), a remote radio head (RRH), a baseband unit (BBU), an RU, a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5 G and 5.5 G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device. Access device 107 may include a controller device. For example, access device 107 may include a RAN Intelligent Controller (RIC).

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

External network 115 may include one or multiple networks of one or multiple types and technologies. For example, external network 115 may be implemented to include a service or an application layer network, a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application, service, or asset (application service).

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines (VMs), SDN devices, cloud computing devices, platforms, and other types of network devices, platforms, and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

According to an exemplary embodiment, external devices 117 may include one or multiple network devices that provide application layer network management service. For example, as illustrated, application service manager 119 may provide application layer network management service, as described herein. Application service manager 119 is described further herein.

Core network 120 may include one or multiple networks of one or multiple network types and technologies. Core network 120 may include a complementary network of access network 105. For example, core network 120 may be implemented to include an NGC network, an EPC of an LTE network, an LTE-Advanced (LTE-A) network, and/or an LTE-A Pro network, a future generation core network (e.g., a 5G, a 6G, a 7G, or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

Figure 2:
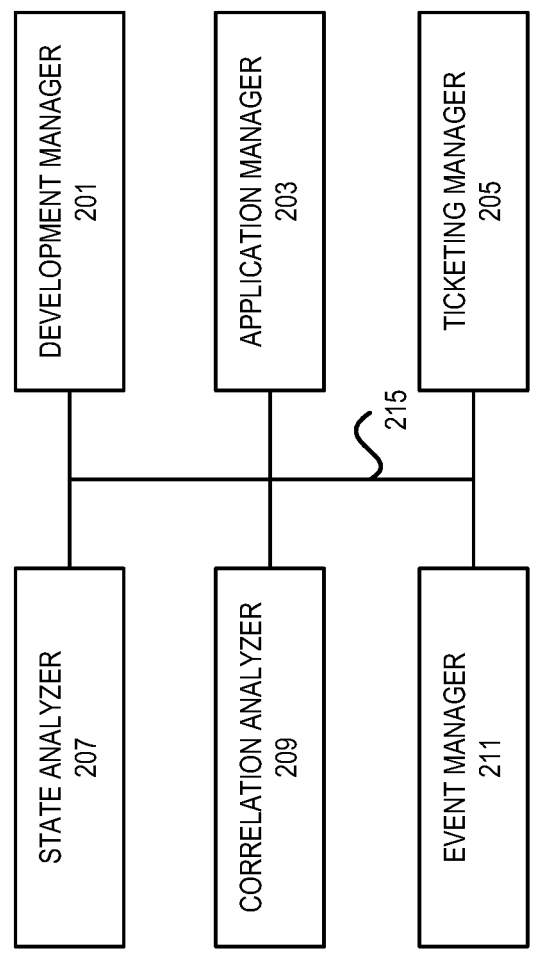
FIG. 2 is a diagram illustrating exemplary components in which an exemplary embodiment of an application layer network management service may be implemented.

FIG. 2 is a diagram illustrating exemplary components in which an exemplary embodiment of application layer network management service may be implemented. As illustrated, application service manager 119 may include a development manager 201, an application manager 203, a ticketing manager 205, a state analyzer 207, a correlation analyzer 209, and an event manager 211. According to some exemplary embodiments, one or more of the components may be communicatively coupled via a link 215. For example, link 215 may be implemented as a hardware link (e.g., a bus, a shared memory space, etc.), a software link (e.g., inter-process communication (IPC), etc.) or some other type of communicative link (e.g., an application programming interface (API), a wired connection, an optical connection, a wireless connection, etc.).

The number, type, and arrangement of components and links are exemplary. According to other exemplary embodiments, application service manager 119 may include additional, fewer, and/or different components to provide application layer network management service or a sub-service, a function, and/or a step of a process in support of application layer network management service, as described herein.

Development manager 201 may include logic that enables a user to configure the management of an application service. Development manager 201 may provide SDKs that enable the user to configure and manage various facets of an application service. For example, there may be SDKs that pertain to discovery and connectivity (e.g., application server selection for a given end device 130 and location, application service request management, load-balancing, and other connection-related tasks); network resource management (e.g., resource availability and resource utilization pertaining to physical, logical, and/or virtual resources, host devices, containers, virtual machines, processors, memory, storage, communication interfaces, communication links, and other types of network resources (e.g., network slices, etc.); life cycle management (e.g., containers, virtual machines, host devices, application service servers, and/or other types of application service instances) relating to instantiation, creation, deletion, or some other operational state of a life cycle (e.g., refresh, pause, suspend, reboot, or another type of state or status); stateful application service management that may relate to backing up, restoring, cloning, migration (e.g., to another host device, to another virtual entity, to another application layer network, etc.), solution artifacts (e.g., dependencies, etc.), and/or other types of similar and/or related tasks; notification, alarms, and ticketing; information collection and analysis, such as service level agreement (SLA), key performance indicator (KPI), and performance metric information pertaining to an application service and network resources; and other management tasks, for example. Development manager 201 may also provide APIs and other types of developmental tools that may be used to support the management of the application service. Development manager 201 may include security features (e.g., authorization, authentication, role-based access control (RBAC), etc.) pertaining to access and use of the application layer network management service.

Development manager 201 may permit a user to develop configuration data pertaining to certain events that may be managed a learning-based and/or intelligence logic, such as reinforcement-based learning, unsupervised learning, semi-supervised learning, supervised learning, deep learning, artificial intelligence (AI), machine learning (ML), and/or other types of device intelligence. For example, the user may wish to configure the intelligence logic to identify application service errors and events pertaining to the application layer network and external devices 117 associated with the application service and the application service provider. According to some exemplary embodiments, the intelligence logic may also manage other types of events pertaining to access network 105, core network 120, and/or other networks associated with a network provider that may also support the application service, as described herein, for example. In this way, the application layer network management service may permit the application service provider, for example, to configure the identification of particular events as well as the actions or procedures that address such events. The intelligence logic may analyze information of relevance for the operation of the application service, identify the presence or absence of events that may need to be addressed, and make decisions on addressing the events. The intelligence logic may invoke or execute reactive or proactive measures or procedures.

According to an exemplary embodiment, development manager 201 may provide pre-configured functional blocks and/or workflows directed to a managerial facet of the application service that the user may use or modify (e.g., customize). Additionally, or alternatively, development manager 201 may allow the user to develop his/her own functional entities and/or workflows from scratch, for example. Development manager 201 may permit the user to create a management function or a workflow pertaining to an application service.

Application manager 203 may include logic that enables the user to deploy management functions and workflows that may pertain to an application service and may have been created using development manager 201. Application manager 203 may enable the deployment of pre-configured, customized, and proprietary management functions and workflows for the management of the application service. Application manager 203 may enable the deployment and use of different versions of the management function and the workflow to manage the application service. Development manager 201 or application manager 203 may permit the user to test the management function and the workflow in an application layer network that may host the application service.

Ticketing manager 205 may include logic that provides a ticketing service directed to failures or other issues relating to the provisioning of the application service. For example, ticketing manager 205 may receive a request or a ticket pertaining to the operation of the application service and/or a supporting network. The request or the ticket may include context and/or state information pertaining to the issue. Personnel of a network service provider, such as support engineers of an application layer network and/or other networks (e.g., RAN, core, backhaul, etc.), may investigate root causes of a problem and may provide remedial action. Ticketing manager 205 may also provide notifications and/or alerts to application service providers regarding the requests or tickets and measures taken that are responsive to the requests or tickets. The user may configure ticketing manager 205 to identify application service events or other types of events that executed actions or procedures (e.g., management functions, workflows, etc.) were unable to remedy or properly address, reasons for failures, and/or other types of context information.

State analyzer 207 may include logic that interfaces and ingests various types of information. For example, state analyzer 207 may obtain state information pertaining to access network 105, external network 115, core network 122, and/or other networks, as described herein. State analyzer 207 may obtain state information from various access devices 107, core devices 122, external devices 117, other network devices (e.g., backhaul, fronthaul, etc.), and/or network performance monitoring devices, for example. The state information may include load or utilization values and/or available resource values pertaining to various types of resources (e.g., physical, virtual, logical, hardware, software, communication interfaces, etc.) associated with network devices and communication links (e.g., wireless, wired, optical, etc.), radio resources, information pertaining to data radio bearers, uplink, and downlink channels, and so forth. The state information may include other types of data, such data indicating a KPI, a performance metric value (e.g., delay, throughput, error rate, round trip time, bit rate, and/or another type of metric), a level of congestion data (e.g., low, medium, high, or other value), and/or data indicating a current and/or predictive network condition. The state information may also include the number of application service requests received over a period of time, application service performance metrics (e.g., average response time, queue time, application availability, and/or other types of performance values or scores).

Correlation analyzer 209 may include intelligence logic (e.g., AI, ML, etc.) that may identify events based on the analysis of the state information, for example. Correlation analyzer 209 may determine what actions are to be taken, if any, based on the identified events. For example, correlation analyzer 209 may identify an event, such as an application service error or another type of application service degradation based on network latency issues. According to an exemplary embodiment, correlation analyzer 209 may be configured to identify application service events (e.g., configured by an application service provider of an application service via application network layer management service) and non-application service events. According to other exemplary embodiments, correlation analyzer 209 may be configured to other types of events.

Correlation analyzer 209 may invoke an action or a procedure that addresses the identified event. According to various exemplary embodiments, the action may be proactive, reactive, or may relate to optimization of various facets of the application service, such as auto-scaling, backing up, restoring, migrating, or another type of application service-related optimization. Correlation analyzer 209 may identify a current event or a prospective or predictive event. Correlation analyzer 209 may also determine when to invoke a ticketing service provided by ticketing manager 205. For example, correlation analyzer 209 may identify an event in which the appropriate action is to provide the ticketing service, as described herein.

According to an exemplary embodiment, correlation analyzer 209 may be configured to select a pre-configured management function or workflow (e.g., a series of management functions that provide a workflow), a customized management function or workflow, or a new or proprietary management function or workflow based on one or multiple criteria associated with an application service event. For example, the criteria may include the severity of the event (e.g., based on values, number of application service users impacted, the amount of time associated with the event, the number of application service servers and/or MEC networks impacted, etc.), the number of previous attempts to remedy the event, the type of actions previously attempted, if any, and/or other types of context information pertaining to the event.

Event manager 211 may include logic that manages the execution of the action or procedure selected by correlation analyzer 209. For example, event manager 211 may run or cause to execute the action or the procedure. Event manager 211 may provide correlation engine 209 with verification or acknowledgement that the action or the procedure was successfully executed or run. Depending on the action, the execution of the action may involve communication with various networks (e.g., access network 105, external network 115, core network 120, and/or other networks), network devices (e.g., access devices 107, external devices 117, core devices 122, and/or other network devices), re-provisioning of network resources, and/or other network-related adjustments (e.g., various types of optimizations as described herein, or other types of remedial or preventative actions, for example).

According to an exemplary embodiment, for application service events for example, event manager 211 may include execution of the action by external device 117 of a MEC network. The MEC network may be implemented using one or multiple technologies including, for example, network function virtualization (NFV), containers, SDN, cloud computing, Infrastructure-as-a-Service (IaaS), Platform-as-a-Service (PaaS), Software-as-a-Service (SaaS), or another type of network technology. Depending on the implementation, network devices of the MEC network (e.g., external device 117) may include an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, and/or other types of network devices (e.g., routers, core devices 122, an ingress device, a load balancer, etc.), and network resources (e.g., storage devices, communication links, host devices, VMs, etc.). According to other exemplary embodiments, for application service events, event manager 211 may be implemented by another type of network device and/or another type of application layer network, as described herein.

Figure 3:
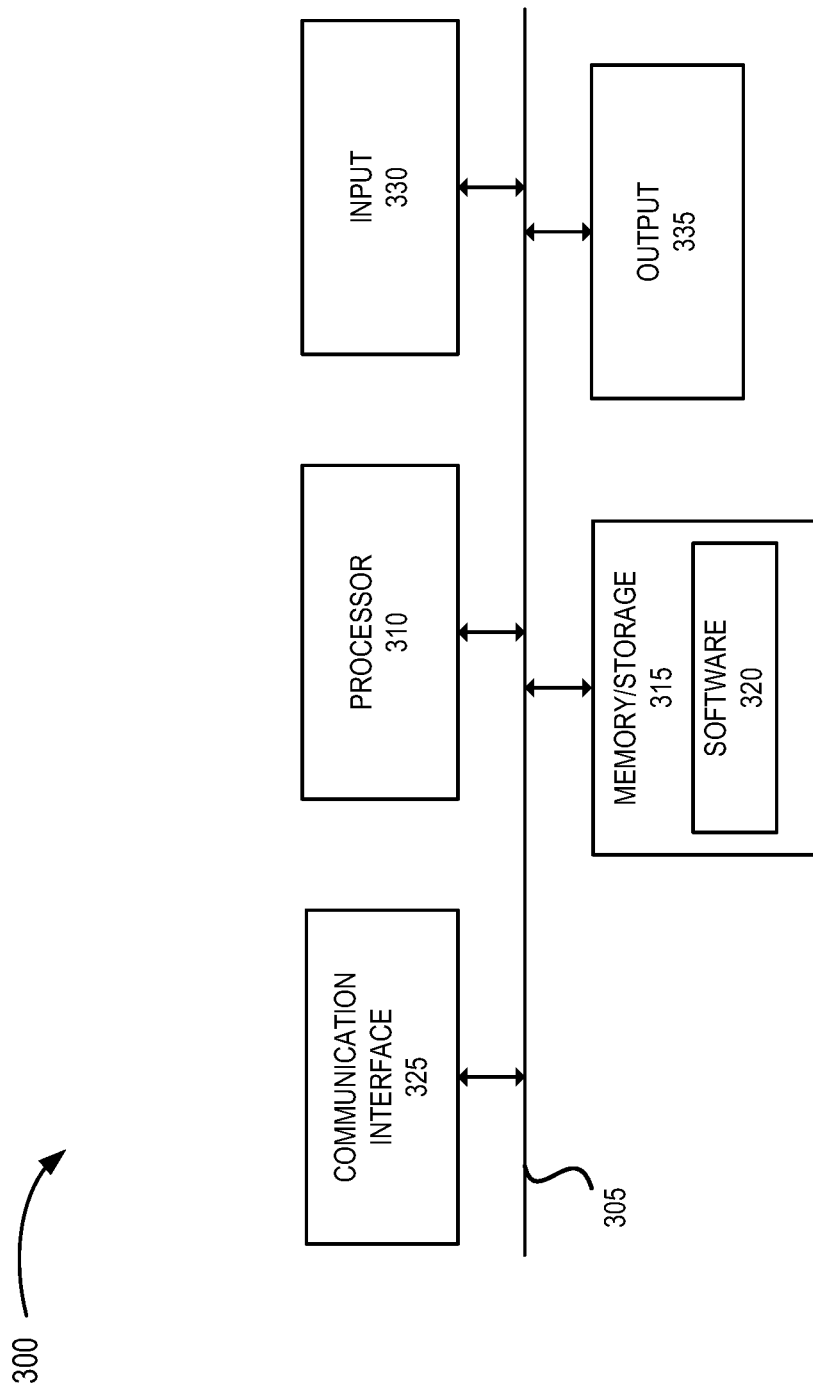
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, application service manager 119, core device 122, end device 130, and/or other types of network devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to application service manager 119, software 320 may include an application that, when executed by processor 310, provides a function and/or a process of application layer network management service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, application programming interface (API), etc.). Communication interface 325 may be implemented as a point-to-point interface, a service-based interface, or a reference interface, for example.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application layer network (e.g., external network 115) and/or another type of network (e.g., access network 105, core network 120, etc.). Thus, network devices described herein may be implemented as device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
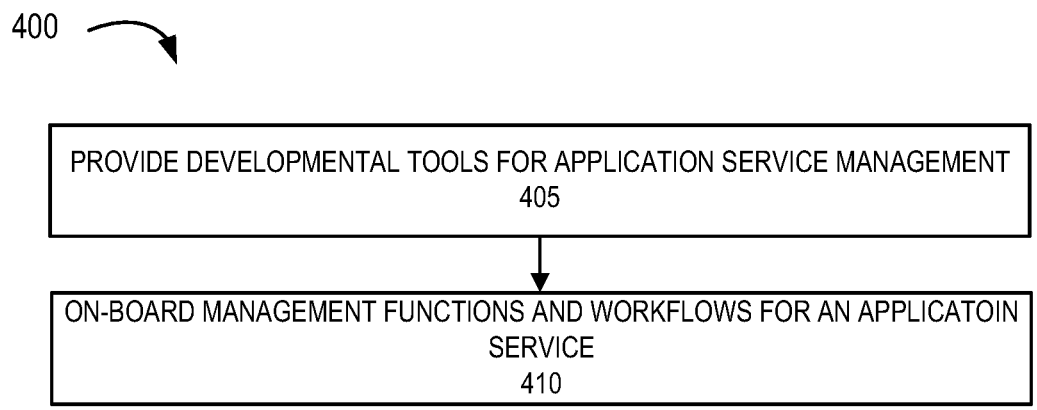
FIG. 4 is a flow diagram illustrating an exemplary process of an exemplary embodiment of an application layer network management service.

FIG. 4 is a flow diagram illustrating another exemplary process 400 of an exemplary embodiment of application layer network management service. According to an exemplary embodiment, application service manager 119 may perform a step of process 400. For example, a component of application service manager 119, such as development manager 201 or application manager 203 may perform a step of process 400. According to an exemplary implementation, processor 310 executes software 320 to perform the step of process 400, as described herein. Alternatively, the step may be performed by execution of only hardware.

According to an exemplary embodiment, the users of application service manager 119, as described in relation to process 400, may be of one or multiple application service providers that may each be providing an application service via an application layer network. For example, an application service provider (entity A) of an application service may use an application layer network (e.g., a MEC network or another type of network as described herein) of an application layer network provider (entity B). In this way, the application layer network provider may allow various application service providers (e.g., potentially a multi-tenant environment) to provision and manage their application services using the application layer network management service of application service manager 119. In some cases, the application layer network provider may also provide access and use of other networks (e.g., access network 105, core network 120, and other types of networks, as described herein) that supports access to the application services by end devices 130 and/or users of end devices 130.

In block 405, application service manager 119 may provide developmental tools for application service management. For example, application service manager 119 may include a portal or another type of user interface that provides an interactive and developmental environment for users. For example, application service manager 119 may allow users to create managerial functions and/or workflows directed to the management of an application service, as described herein. The developmental tools may include SDKs, APIs, and other assets that may be used by the users. Application service manager 119 may provide for the upload and download of certain tools by users. The developmental tools may include pre-configured management functions and/or workflows directed to various facets of application service management and optimization, as described herein. Additionally, for example, the developmental tools may permit the users to customize or create new or proprietary management functions and/or workflows, as described herein. The developmental tools may also permit the users to modify or create different versions of management functions and/or workflows.

In block 410, application service manager 119 may on-board management functions and/or workflows for an application service. For example, application service manager 119 may permit the users to configure and assign various management functions and/or workflows to various facets of management of the application service. According to an exemplary embodiment, application service manager 119 may permit the users to on-board and use pre-configured, customized, and/or new/proprietary management functions and/or workflows for the management of the application service, as described herein. According to an exemplary embodiment, application service manager 119 may permit the users to configure various criteria upon which a management function and/or a workflow is invoked and executed, as described herein.

Application service manager 119 may manage and configure the interfacing between the management functions and/or workflows logic with application layer network devices and other networks and network devices (e.g., access network 105, access devices 107, external network 115, external devices 117, core network 120, core devices 122, and other types of networks/network devices, as described herein) that may be associated with the application layer network provider. For example, application service manager 119 may manage and configure the communication and interfacing for obtaining state information, as described herein. Additionally, for example, application service manager 119 may manage and configure the communication and interfacing with various external devices 117 of application layer network provider and hosting devices of the application service.

FIG. 4 illustrates an exemplary embodiment of a process of application layer network management service, according to other exemplary embodiments, the application layer network management service may perform additional operations, fewer operations, and/or different operations than those illustrated and described.

Figure 5:
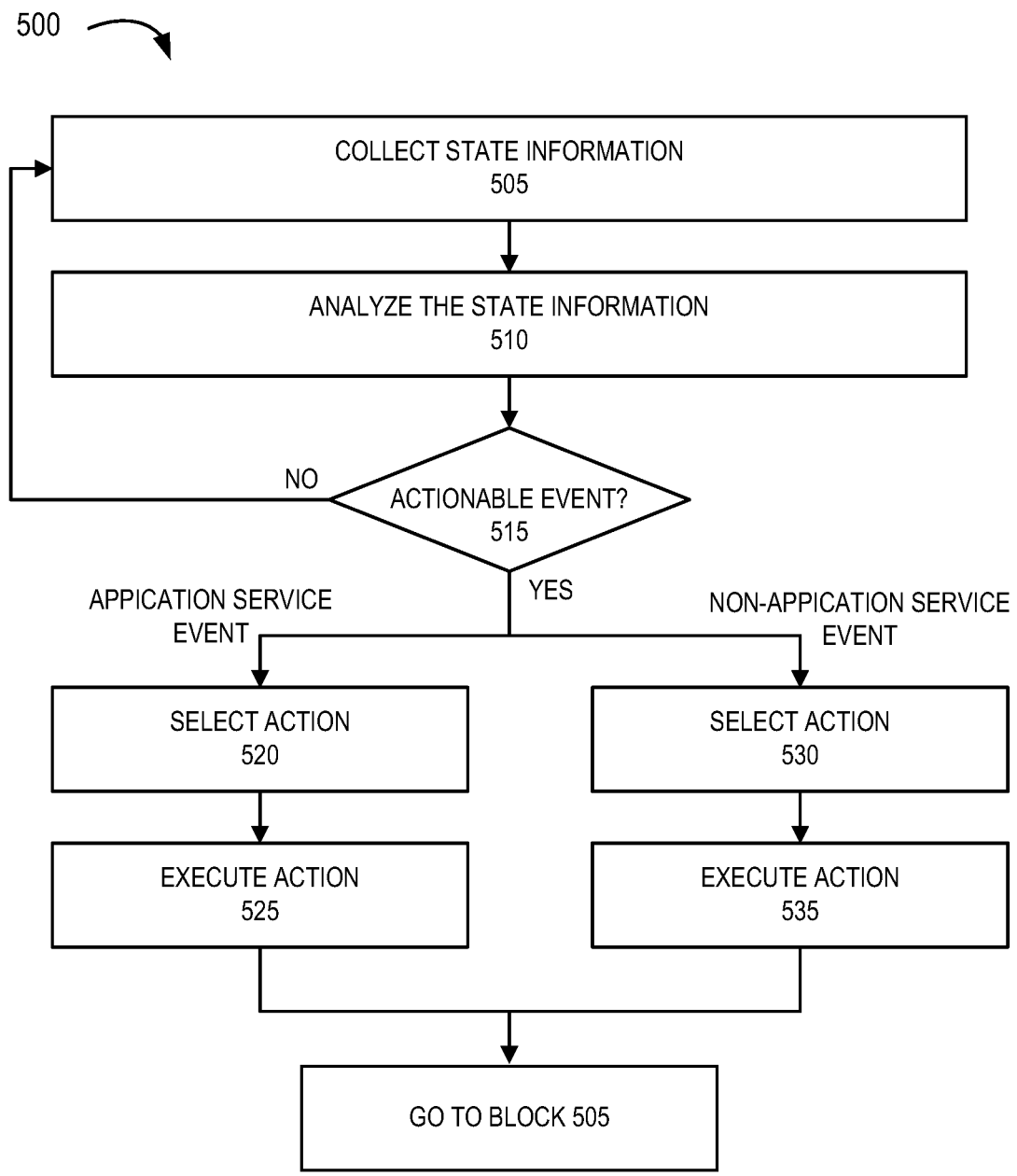
FIG. 5 is a flow diagram illustrating another exemplary process of an exemplary embodiment of an application layer network management service.

FIG. 5 is a flow diagram illustrating an exemplary process 500 of an exemplary embodiment of application layer network management service. According to an exemplary embodiment, application service manager 119 may perform a step of process 500. For example, a component of application service manager 119, such as state analyzer 207, correlation analyzer 209, event manager 211, and ticketing manager 205 may perform a step of process 500. According to an exemplary implementation, processor 310 executes software 320 to perform the step of process 500, as described herein. Alternatively, the step may be performed by execution of only hardware.

In block 505, application service manager 119 may collect state information. For example, application service manager 119 may obtain state information pertaining to access network 105, external network 115, core network 122, and/or other networks, as described herein.

In block 510, application service manager 119 may analyze the state information. For example, application service manager 119 may analyze the state information based on various criteria, threshold values, rules, and/or policies, for example.

In block 515, application service manager 119 may determine whether there is an actionable event based on the analysis of the state information. For example, application service manager 119 may determine that some events may require an action or a procedure to be executed while other events may not. When application service manager 119 determines that there is not an actionable event (block 515-NO), process 500 may return to block 505. When application service manager 119 determines that there is an actionable event (block 515-YES), process 500 may continue to block 520, block 530, or both. For example, as illustrated in FIG. 5, according to an exemplary embodiment, application service manager 119 may identify an actionable event as an application service event or a non-application service event. According to other exemplary embodiments, additional and/or different category of events may be implemented.

In block 520, when an application service event, application service manager 119 may select an action correlated to the identified event that pertains to an application service. As previously described, application service manager 119 may select a pre-configured, a customized, or a new/proprietary management function and/or workflow. In some instances, the action may include executing or invoking the ticketing service. For example, when a previous action was unsuccessful, application service manager 119 may execute or invoke the ticketing service. Application service manager 119 perform multiple strategies to remedy an identified event, and when various strategies, rollbacks, and/or other types of compensation measures fail to work, application service manager 119 may coordinate with ticketing manager 205 to capture the context information (e.g., previous steps/actions taken, reasons for and types of failures, and other types of relevant information as described herein). In block 525, application service manager 119 may execute the action.

In block 530, when a non-application service event, application service manager 119 may select an action correlated to the identified event. For example, application service manager 119 may select an action or a procedure configured by a network provider or a non-application service provider of the application service. In block 535, application service manager 119 may execute the action. As illustrated, after the execution of the action(s) of blocks 525 and/or 535, process 500 may return to block 505.

FIG. 5 illustrates an exemplary embodiment of a process of application layer network management service, however according to other exemplary embodiments, the application layer network management service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   analyzing, by a network device of a first entity included in an application layer network of the first entity, state information that includes information pertaining to an application device executing an application service of a second entity in the application layer network;
   determining, by the network device based on the analyzing, that there is an actionable event pertaining to a degradation of the application service currently executing;
   selecting, by the network device, a procedure that addresses the actionable event, wherein the procedure is configured by the second entity of the application service that is different from the first entity; and
   executing, by the network device, the procedure.

2. The method of claim 1, further comprising:
   providing, by the network device, developmental tools to configure procedures for actionable events associated with application services that include the application service; and
   receiving, by the network device, a configuration of the procedure from the second entity.

3. The method of claim 2, wherein the developmental tools include software development kits, and the configuration of the procedure includes at least one of a management function or a workflow for the application service created based on at least one of the developmental tools.

4. The method of claim 2, wherein the configuration of the procedure includes at least one of a management function or a workflow of the first entity that is modified based on at least one of the developmental tools.

5. The method of claim 1, further comprising:
determining, by the network device, that the actionable event is an application service event and not a non-application service event.

6. The method of claim 1, wherein the procedure pertains to autoscaling, migrating, restoring, or terminating the application service.

7. The method of claim 1, further comprising:
determining, by the network device after the executing, that the procedure was unsuccessful;
generating, by the network device, a ticket that includes context information pertaining to the actionable event; and
transmitting, by the network device, the ticket to another network device of the first entity.

8. The method of claim 1, wherein the application layer network is a multi-access edge computing (MEC) network.

9. A network device comprising:
a processor configured to:
analyze state information that includes information pertaining to an application device executing an application service of a second entity in an application layer network of a first entity, and wherein the network device is of the first entity and included in the application layer network;
determine, based on the analysis, that there is an actionable event pertaining to a degradation of the application service currently executing;
select a procedure that addresses the actionable event, wherein the procedure is configured by the second entity of the application service that is different from the first entity; and
execute the procedure.

10. The network device of claim 9, wherein the processor is further configured to:
provide developmental tools to configure procedures for actionable events associated with application services that include the application service; and
receive a configuration of the procedure from the second entity.

11. The network device of claim 10, wherein the developmental tools include software development kits, and the configuration of the procedure includes at least one of a management function or a workflow for the application service created based on at least one of the developmental tools.

12. The network device of claim 10, wherein the configuration of the procedure includes at least one of a management function or a workflow of the first entity that is modified based on at least one of the developmental tools.

13. The network device of claim 9, wherein the processor is further configured to:
determine that the actionable event is an application service event and not a non-application service event.

14. The network device of claim 9, wherein the procedure pertains to autoscaling, migrating, restoring, or terminating the application service.

15. The network device of claim 9, wherein the processor is further configured to:
determine, after the execution, that the procedure was unsuccessful;
generate a ticket that includes context information pertaining to the actionable event; and
transmit the ticket to another network device of the first entity.

16. The network device of claim 9, wherein the application layer network is a multi-access edge computing (MEC) network.

17. A non-transitory computer-readable storage medium storing instructions executable by a processor of a network device of a first entity, which when executed cause the processor to:
analyze state information that includes information pertaining to an application device executing an application service of a second entity in an application layer network of a first entity, and wherein the network device is included in the application layer network;
determine, based on the analysis, that there is an actionable event pertaining to a degradation of the application service currently executing;
select a procedure that addresses the actionable event, wherein the procedure is configured by the second entity of the application service that is different from the first entity; and
execute the procedure.

18. The non-transitory computer-readable storage medium of claim 17, wherein the instructions comprise further instructions, which when executed, cause the processor to:
provide developmental tools to configure procedures for actionable events associated with application services that include the application service; and
receive a configuration of the procedure from the second entity.

19. The non-transitory computer-readable storage medium of claim 18, wherein the developmental tools include software development kits, and the configuration of the procedure includes at least one of a management function or a workflow for the application service created based on at least one of the developmental tools.

20. The non-transitory computer-readable storage medium of claim 18, wherein the configuration of the procedure includes at least one of a management function or a workflow of the first entity that is modified based on at least one of the developmental tools.

* * * * *